Figure 1:
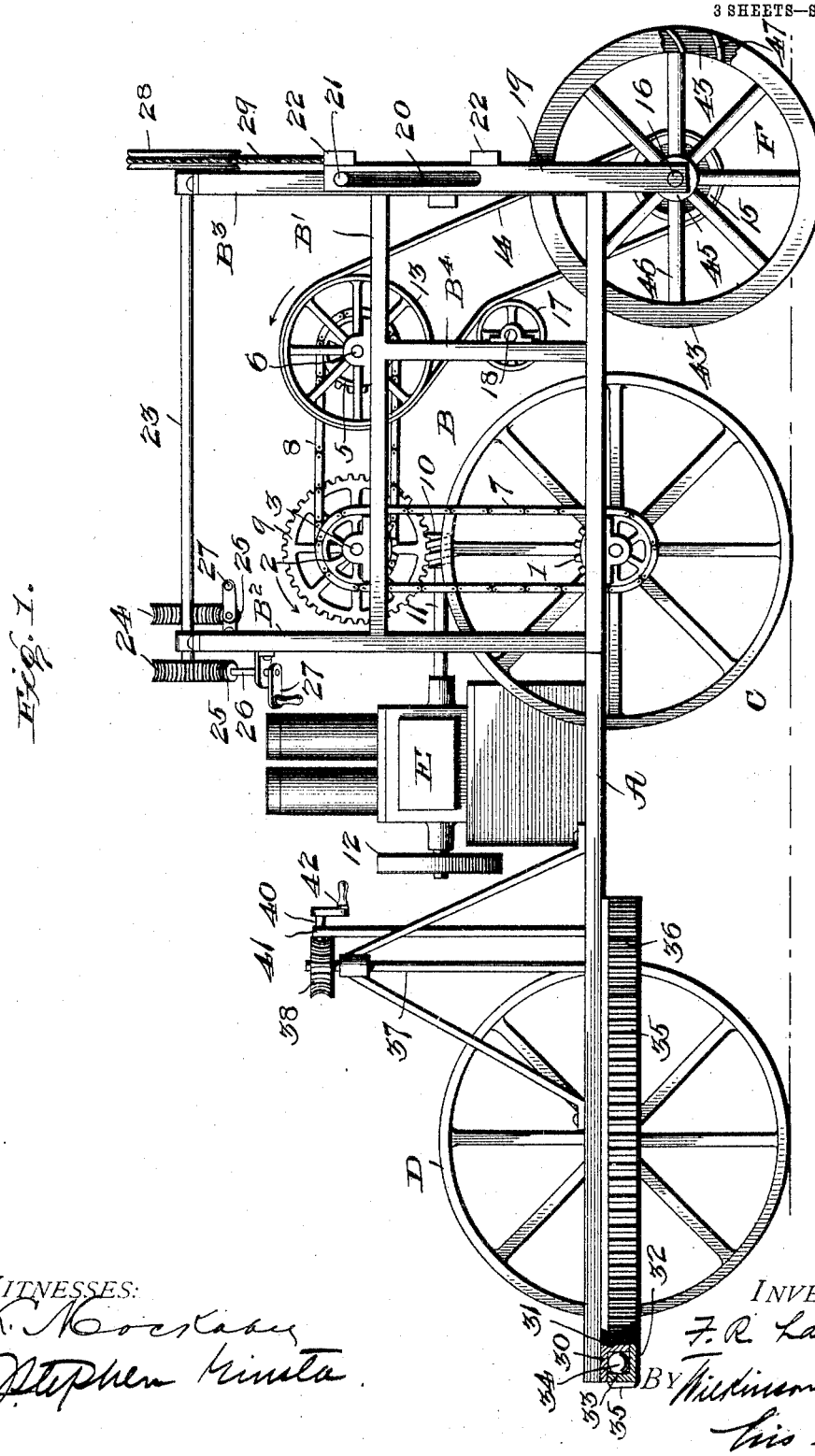

No. 783,967. PATENTED FEB. 28, 1905.
F. R. LANIER.
SELF PROPELLED PLOW.
APPLICATION FILED FEB. 5, 1904.

3 SHEETS—SHEET 1.

WITNESSES:

INVENTOR
F. R. Lanier
BY
Attorneys

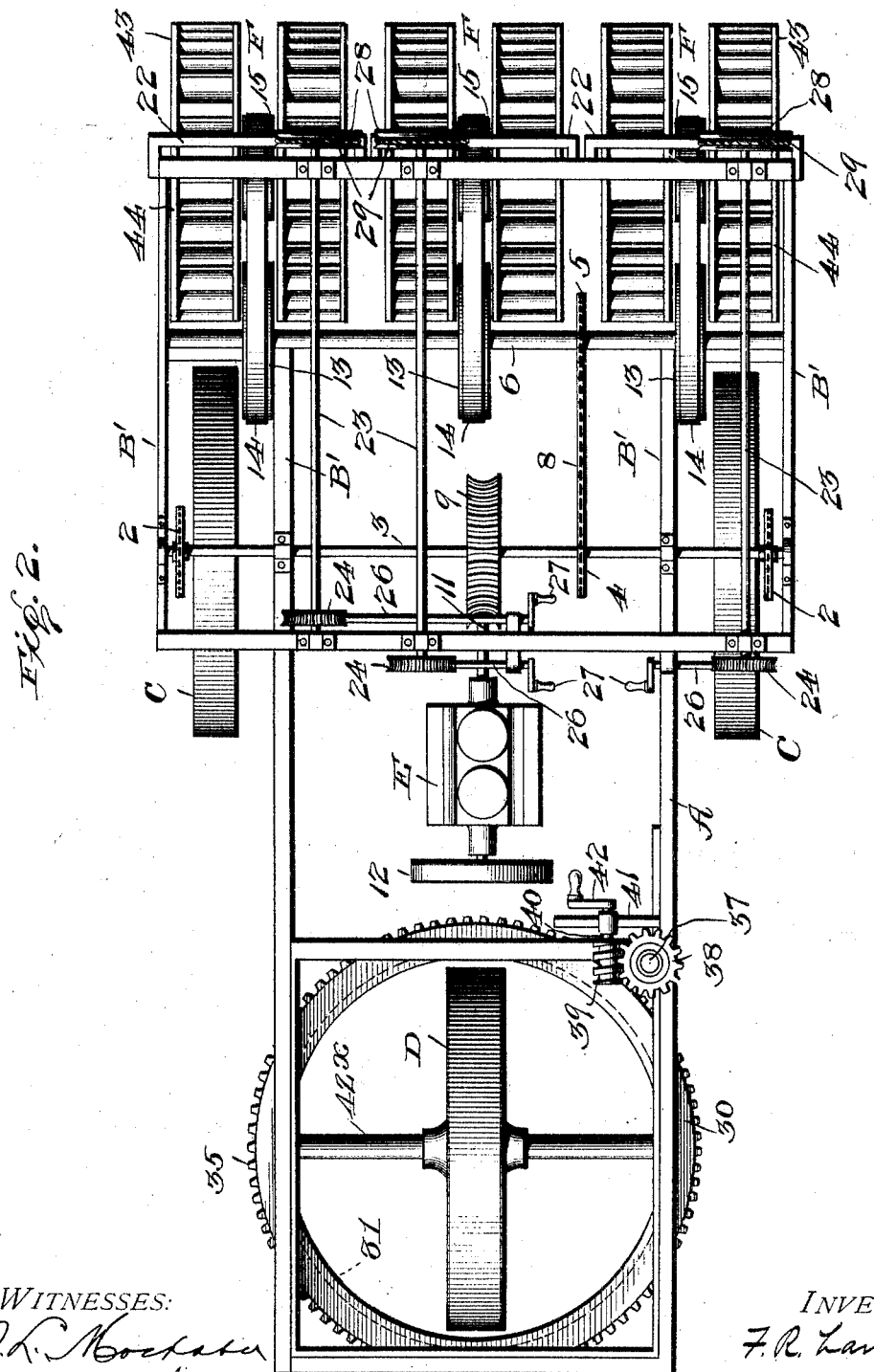

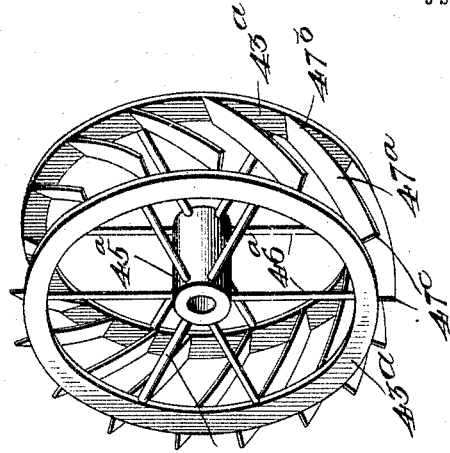
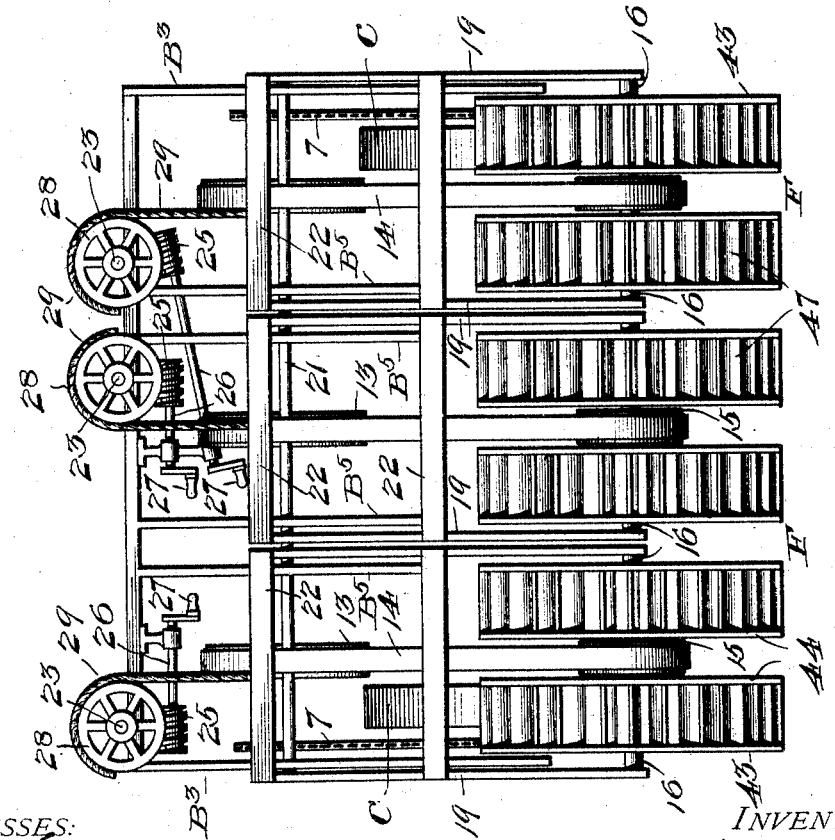

No. 783,967.                                                       Patented February 28, 1905.

UNITED STATES PATENT OFFICE.

FELIX ROBERTSON LANIER, OF GRIDER, ARKANSAS, ASSIGNOR TO CHARLES D. BRIDGES, OF MEMPHIS, TENNESSEE.

SELF-PROPELLED PLOW.

SPECIFICATION forming part of Letters Patent No. 783,967, dated February 28, 1905.

Application filed February 5, 1904. Serial No. 192,187.

*To all whom it may concern:*

Be it known that I, FELIX ROBERTSON LANIER, a citizen of the United States, residing at Grider, in the county of Mississippi and State of Arkansas, have invented certain new and useful Improvements in Self-Propelled Plows; and I do hereby declare the following to be a full, clear, and exact description of the invention, such as will enable others skilled in the art to which it appertains to make and use the same.

My invention relates to self-propelled vehicles for agricultural purposes, and is especially applicable for use as a motor-plow. In machines of this character, as in all other classes of machines, the main object is to provide coöperative means and mechanism of such a character as to secure the highest degree of effectiveness and durability in the simplest manner and at the least expense. Having this object in view, in carrying out my invention I have provided a suitable supporting-frame with driving and steering wheels and mechanism for operating the same and in conjunction therewith have arranged a plurality of adjustably-mounted rotary plows, preferably at the rear end of said supporting-frame, adapted to be driven directly by the vehicle-propelling power and in the same direction as the traction-wheels, whereby the rotary plows in addition to their function of breaking and turning over the soil aid also in assisting instead of retarding the forward motion of the vehicle.

To more fully understand the invention, reference is had to the accompanying drawings, illustrating the same, in which the same parts are indicated by the same characters throughout the several views, and in which—

Figure 1 represents a side elevation of the improved plow, parts being broken away; Fig. 2, a plan view; Fig. 3, a rear elevation, and Fig. 4 a perspective view showing a modified form of one of the plowing-wheels.

A designates the main supporting-frame, carrying the rear upright frame B. C designates the driving or traction wheels; D, the steering-wheel; E, a motor of any suitable or preferred type, a gasolene-motor being preferable, and F the rotary plowing-wheels.

The traction-wheels C are journaled in suitable bearings on the frame A and carry the sprocket-wheels 1, arranged in alinement with similar sprocket-wheels 2, mounted on the end of the shaft 3, extending transversely across the frame B and journaled in suitable bearings carried by the beams B', secured to the forward and rear uprights $B^2$ $B^3$ of the upright frame B. 4 is another sprocket-wheel carried by the shaft 3 and disposed in alinement with a similar sprocket-wheel 5 on the shaft 6, similarly journaled in suitable bearings on the beams B' toward the rear of the upright frame.

7 and 8 are sprocket-chains respectively connecting the sprockets 1 and 2 and 4 and 5.

9 is a worm-wheel on the shaft 3 meshing with the worm 10 on the driving-shaft 11 of the motor, the other end of the shaft carrying the fly-wheel 12.

13 designates a plurality of belt-wheels (preferably one for each pair of plowing-wheels hereinafter described) mounted on the transverse shaft 6 and connected by the belts 14 with belt-pulleys 15 on the shafts 16, carrying the plowing-wheels F, idler-wheels 17, carried by shafts 18, suitably journaled on the uprights $B^4$, being interposed against said belts. The plowing-wheels F may be mounted singly, but are preferably mounted in pairs on the shafts 16, with the belt-pulleys 15 therebetween, and the shafts 16 themselves are journaled in the lower ends of the hanger-bars 19, slotted, as at 20, and slidably suspended, as clearly illustrated in Figs. 1 and 3, and pivoting in its suspended position around the rod 21, extending transversely across the rear of the upright frame B, the hanger-bars 19 being transversely braced by the cross-beams 22. The inward swing of the hanger-bars 19, and hence the plowing-wheels, is limited by the rear uprights $B^3$ and the depending rods or beams $B^5$, (see Fig. 3,) against which the cross-pieces 22 normally abut.

23 designates shafts suitably journaled on and disposed longitudinally of the upright frame B. These shafts are provided at their forward ends with the worm-wheels 24, meshing with the worms 25, carried on the spindles 26, suitably journaled on the frame and provided with operating-handles 27. The other ends of the shafts 23 are provided with the sheaves 28, to which are attached the cables 29, secured at their other ends to the hanger-bar frames.

On the under side of the forward end of the main frame A is a circular rim 30, having a depending annular flange portion 31. Below said rim 30 is a turn-table 32, having the upwardly-extending annular flange portion 33, the annular flanges 31 and 33 being so spaced apart as to form a raceway for a plurality of balls 34 and provide a ball-bearing connection between the rims 30 and 32, as clearly shown at the broken-away portion to the left of Fig. 1. The outer circumferential surface of the flange portion 33 of the rim 32, forming the base-plate of the turn-table casting, is provided with gear-teeth 35, adapted to mesh with a gear-wheel 36 on the upright shaft 37, provided at its upper end with a worm-wheel 38, meshing with a worm 39 on the spindle 40, journaled in a suitable support 41, the spindle 40 being provided with a suitable operating-handle 42. The steering-wheel D is mounted, centrally of said turn-table mechanism, on an axle $42^x$, suitably journaled in bearings (not shown) carried by the turn-table casting 32.

In the drawings I have not illustrated any means for preventing the displacement of the rim 30 and the turn-table plate 32 relatively to each other, as the weight of the vehicle will prevent their displacement; but any suitable well-known means might be employed, if necessary.

In Figs. 1, 2, and 3 I have illustrated the plowing-wheels F as comprising the annular rims 43, having the peripheral cutting edge 44, said rims being secured to hubs 45 by the spokes 46. These rims, as shown, are spaced apart, and rigidly mounted between the same are the transversely-disposed cutting-blades 47, upwardly curved toward the periphery of the rims, as shown clearly in Fig. 1.

In Fig. 4 is represented a modified form of the plowing-wheels. In this form $43^a$ represents the annular rims, $45^a$ the hub, and $46^a$ the spokes. $47^a$ represents the cutting-blades spirally curved and diagonally disposed, as clearly illustrated, between the annular rims, one edge, $47^b$, being set substantially flush with the periphery of one rim and the other edge, $47^c$, projecting beyond the periphery, it being understood that the angular disposition and degree of curvature in either construction of the plowing-wheels may be changed at will.

When the machine is in operation, the cutting edges of the plow-blades first come in contact with the soil and are forced down to their full intended depth, each blade cutting a uniform slice of soil, breaking it loose, and forcing it back like a spade is made to do, quite as effectively, although much more rapidly. Of course the degree of power required to rotate the plowing-wheels is dependent upon their speed of rotation, for the higher the speed the thinner will be slices made by each blade, naturally requiring less power to drive them than if the speed were lower and the slice thicker. The speed of the plowing-wheels is governed by the particular gearing between the driving-shaft and the band-pulleys, preferably in a ratio not exceeding three to one to the traction-wheels. For plowing purposes it is necessary that the plowing-wheels revolve at a greater speed than the traction-wheels; but for other purposes, however, the gearing may be so disposed as to rotate the plowing-wheels at the same rate of speed as the traction-wheels, when the plowing-wheels would act, in conjunction with the traction-wheels, as driving-wheels of great power, the blades being firmly pressed into the soil their full width. Thus the machine might be used for other field purposes—such, for instance, as dragging plows, harrows, &c.

It will be obvious that in operation motion is imparted to the shaft 3 by the worm 10 and worm-gear 9, which in turn, through the medium of the sprockets 2 and 1, 4 and 5 and the connecting sprocket-chains, rotate the traction-wheels C and band-wheel 13, and likewise the belt 14 imparts motion to the belt-pulleys 15 and plows F, it being observed that by this arrangement the traction-wheels and plowing-wheels are driven in the same direction of rotation and the plowing-wheels, in addition to breaking up and turning over the soil, aid in the forward propulsion of the machine.

The weight of the plowing-wheels normally tends to hold them in their lowermost position below the tread of the traction-wheels; but in operation should any of the plowing-wheels strike an otherwise-insurmountable obstruction it will be obvious that both plowing-wheels of that pair will be permitted to ride safely over the obstruction by the slotted arrangement of the hanger-bars, whereby the hanger-bars will be swung rearwardly, and thereby avoid the plowing-wheels being readily broken or disabled. Again, any one or more pairs of the plowing-wheels may be elevated out of contact with the soil by operating the cables 29 through the medium of the sheaves 28, shafts 23, and worm and worm-wheels 25 and 24, an obvious advantage permitting of the cutting of parallel furrows and when all are raised facilitating the turning of the vehicle in the field, or they may be raised a limited distance only for regulating the depth of the cut.

The operation of the steering mechanism is apparent and needs no further description.

It will be understood that I do not wish to limit myself to the exact details of construction as illustrated and described, for it is obvious that many modifications might be made without departing from the spirit of my invention—for instance, any other suitable form of steering mechanism may be employed—and the statement that the traction-wheels are journaled in suitable bearings is intended to be broad enough to include constructions well known in the art, whereby the wheels may be independently mounted and operated for facilitating the turning around of the vehicle.

Having thus described my invention and the manner of its operation, what I claim is—

1. In a self-propelled plow, the combination with a suitable body-support, of traction-wheels, hanger-bars, normally disposed in a vertical line, suspended from said support and capable of longitudinal adjustment vertically of said support, a rotary plowing member journaled in the lower free ends of said hanger-bars, and means for rotating said traction-wheels and plowing member.

2. In a self-propelled plow, the combination with a suitable body-support, of traction-wheels, vertically-disposed hanger-bars suspended from said support, capable of longitudinal adjustment vertically thereof and independent swing in the arc of a circle, a rotary plowing member journaled in the lower free ends of said hanger-bars, means for adjusting said hanger-bars longitudinally in a substantially vertical line, and means for rotating said traction-wheels and plowing member.

3. In a self-propelled plow, the combination with a suitable body-support, of traction-wheels, hanger-bars, pin-and-slot connections between said hanger-bars and body-support and means coöperating therewith for normally suspending said hanger-bars longitudinally in a vertical line, whereby said hanger-bars may be longitudinally adjusted vertically of said support and free to swing in the arc of a circle, a rotary plowing member journaled in the lower free ends of said hanger-bars, means for elevating said hanger-bars in a vertical line, and means for rotating said traction-wheels and plowing member.

4. In a self-propelled plow, the combination with a suitable body-support, of traction-wheels, pivots on said body-support, longitudinally-slotted hanger-bars engaging said pivots and means for suspending same, whereby said hanger-bars may be adjusted longitudinally in a vertical line and remain free to swing in an arc, a rotary plowing member journaled in the lower free ends of said hanger-bars, and means for rotating said traction-wheels and plowing member.

5. In a self-propelled plow, the combination with a suitable body-support, of traction wheels, vertically-extending adjustable hanger-bars pivotally suspended from said body-support, rotary plows journaled in the free lower ends of said hanger-bars, means for operating said adjustable hanger-bars longitudinally in a substantially vertical line, comprising a sheave provided with a cable operatively connected with said hanger-bars, means for operating said sheave, and means for rotating said traction-wheels and plowing member.

6. In a self-propelled plow, the combination with a suitable body-support, of traction-wheels, adjustable hanger-bars pivotally suspended on said body-support and normally extending longitudinally in a substantially vertical line, a rotary plowing member journaled in the lower free ends of said hanger-bars, means for longitudinally adjusting said hanger-bars for elevating said plowing member in a substantially vertical line, and means for rotating said traction-wheels and plowing member.

7. In a self-propelled plow, the combination with a suitable body-support, of traction-wheels, vertically-disposed hanger-bars, pin-and-slot connections between said hanger-bars and body-support, rotary plowing members journaled in the lower free ends of said hanger-bars, means for operating said hanger-bars longitudinally in a substantially vertical line, and means for rotating said traction-wheels and plowing member.

8. In a self-propelled plow, the combination with a suitable body-support, of traction-wheels, a steering-wheel, pivotally-suspended adjustable hanger-bars disposed longitudinally in a substantially vertical line, a rotary plowing member journaled in the lower free ends of said hanger-bars, means for operating said steering-wheel, and means for rotating said traction-wheels and plowing member.

9. In a self-propelled plow, the combination with a suitable body-support, of traction-wheels, a rotary plowing member suspended from said support, adjustable relatively thereto in a substantially vertical line and free to swing in an arc, a source of motive power and intermediate gearing between same and said traction-wheels and rotary plowing member, means for elevating said plowing member in a substantially vertical line, comprising a shaft, worm-gearing coöperating with said shaft and operating means therefor, and a sheave on the end of said shaft provided with a cable operatively connected with said plowing member's support.

10. In a self-propelled plow, the combination with a suitable body-support, of traction-wheels, a steering-wheel, pivot-pins on said support, vertically-disposed hanger-bars, longitudinally slotted to engage said pivot-pins, rotary plowing means journaled in the lower ends of said hanger-bars, means for suspending and longitudinally adjusting said hanger-bars vertically of said support, a source of motive power, and intermediate gearing between said source of motive power and said traction-wheels and rotary plowing means.

11. In a self-propelled plow, the combination with a suitable body-support, of a steering-wheel and traction-wheels therefor, an upright frame carried by said body-support, vertically-disposed hanger-bars suspended from said upright, capable of longitudinal adjustment vertically of said upright frame and free to swing in an arc, rotary plows journaled in the lower free ends of said hanger-bars, shafts journaled in said upright frame and extending longitudinally of said body-support, worm-gearing operatively connected with said shafts and means for operating the same, sheaves carried at the other ends of said shafts and provided with cables suspending said hanger-bars, a source of motive power, and means operatively connecting said source of motive power with said traction-wheels and rotary plows.

In testimony whereof I affix my signature in presence of two witnesses.

FELIX ROBERTSON LANIER.

Witnesses:
W. M. DEAN,
GEORGE HARSH.